US005632408A

United States Patent [19]

Mitchell

[11] Patent Number: 5,632,408

[45] Date of Patent: May 27, 1997

[54] APPARATUS FOR SECURING AND DISPENSING CURRENCY

[76] Inventor: Jerry B. Mitchell, 3902 Dixie Dr., Garland, Tex. 75041

[21] Appl. No.: 561,460

[22] Filed: Nov. 21, 1995

[51] Int. Cl.[6] .......................... B65B 59/00; B65G 59/06

[52] U.S. Cl. .......................... 221/15; 221/125; 221/129; 221/131; 221/154; 221/177; 221/266; 221/268; 221/281

[58] Field of Search .......................... 221/15, 66, 124, 221/125, 129, 131, 159, 175, 177, 263, 266, 268, 281

[56] References Cited

U.S. PATENT DOCUMENTS

| | | | |
|---|---|---|---|
| 2,508,159 | 5/1950 | Haas | 312/67 |
| 3,101,892 | 8/1963 | Reese, Jr. | 232/1 |
| 3,171,568 | 3/1965 | Arwine | 221/66 |
| 3,367,536 | 2/1968 | Fleagle | 221/125 X |
| 3,410,452 | 11/1968 | Igel et al. | 221/156 |
| 3,593,881 | 7/1971 | Paup | 221/3 |
| 3,630,410 | 12/1971 | Hendrickson | 221/125 |
| 3,870,135 | 3/1975 | Allen | 221/129 X |
| 5,340,967 | 8/1994 | Martin et al. | |

FOREIGN PATENT DOCUMENTS

| | | | |
|---|---|---|---|
| 132590 | 5/1990 | Japan | 221/281 |
| 224197 | 9/1990 | Japan | 221/281 |
| 2166897 | 5/1986 | United Kingdom | 221/125 |

*Primary Examiner*—Boris Milef

*Attorney, Agent, or Firm*—John F. Bryan

[57] ABSTRACT

A safe box is provided with currency containers and a plurality of separate currency chutes with time delay access for security. Manually operated apparatus is provided for aligning and releasing containers into the chutes as well as manually operated drawers for selecting and dispensing only one container from the chutes during any time delay. A door is provided in the front panel for access to the interior of the safe box and the front panel of the safe box is hinged to open the box for servicing.

8 Claims, 4 Drawing Sheets

APPARATUS FOR SECURING AND DISPENSING CURRENCY

FIELD OF THE INVENTION

The present invention relates to safe boxes for securing and dispensing currency according to denomination and most particularly to safe boxes which maintain security while accepting incremental currency deposits and providing a capability to release currency in predetermined increments after a preset time delay.

BACKGROUND AND SUMMARY OF THE INVENTION

The nature of retail commerce is such that currency must be available for making change, and that the amount of currency on hand will increase as business is conducted. Keeping such an accumulation of currency on hand, in excess of change-making requirements, risks physical harm and/or theft in many areas. As an alternative to the inconvenience of making multiple daily bank deposits, on-site security safe boxes have become popular. These devices receive deposits of excess cash at any time, without open access to the secured contents and impose an arbitrary delay period on any withdrawals. Currency is either deposited randomly into the primary chamber through a one-way gate or placed in tubular plastic containers and inserted horizontally into specific separate apertures for limited access withdrawal. The apertures lead to chutes, sized so that the tubular containers are held in a single file stack A time delay is imposed for access which is restricted to withdrawals of a single container so as to dispense only a limited amount of cash. Care must be taken to orient the container properly when dropping it into the chute in order to avoid jamming. An authorized identity code or a key is needed to activate a similar, and usually longer, time delay for open access to the primary chamber of the safe box. Such time delays act to discourage thieves, to whom waiting constitutes an unacceptable risk.

Time delay safe boxes have heretofore relied upon 120VAC power systems to power motors for dispensing selected currency containers in the limited access mode. Power interruptions or mechanism failures may cause delays that are inconvenient or worse and container jamming may result, either from improper insertion or a system malfunction. Service and repair access must be provided for interior motors and mechanisms, which are situated behind the container chutes because of space limitations. Removal of the rear panel of the box, done by pulling the unit out from its usual under-counter location, has been the preferred arrangement for such access. This costly inconvenience to servicing has been tolerable inasmuch as it also deters thievery, and the expense of replacement or repair of the powered dispensing apparatus has been accepted as necessary, if undesirable.

An object of the present invention is therefore to provide for secured deposits and timed release withdrawals of excess currency, without reliance upon uninterrupted electrical service, and a further object is to provide improved reliability and reduced maintenance by apparatus which eliminates container jamming as a failure mode. Yet another object is to further reduce operating costs by providing secure access for repairs without pulling the unit from under-counter.

The present invention accomplishes these objectives by providing a simplified container dispensing mechanism which does not require electrical power for dispensing containers and includes a container alignment and release mechanism, which does not require special care for container insertion. A horizontal supporting member is disposed parallel to and beneath the container insertion axis at each receiving aperture, so as to support and position the container. With the container so aligned, lateral displacement of the supporting member allows it to drop freely into the chute without jamming. The timed delay cycle for change withdrawal is enforced by electrically latched drawers, one for each chute, which are interlocked so that only one container can be withdrawn per cycle. With the elimination of dispensing motors and a non-jamming container chute, maintenance expense per unit is greatly reduced. Even so, ready access for service is provided by hinging the front panel of the lock box, together with the change chutes, to swing out and down. The front panel is held in the closed, vertical position by a latch which can be released only from inside the primary chamber.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE DRAWINGS

Figure 1:
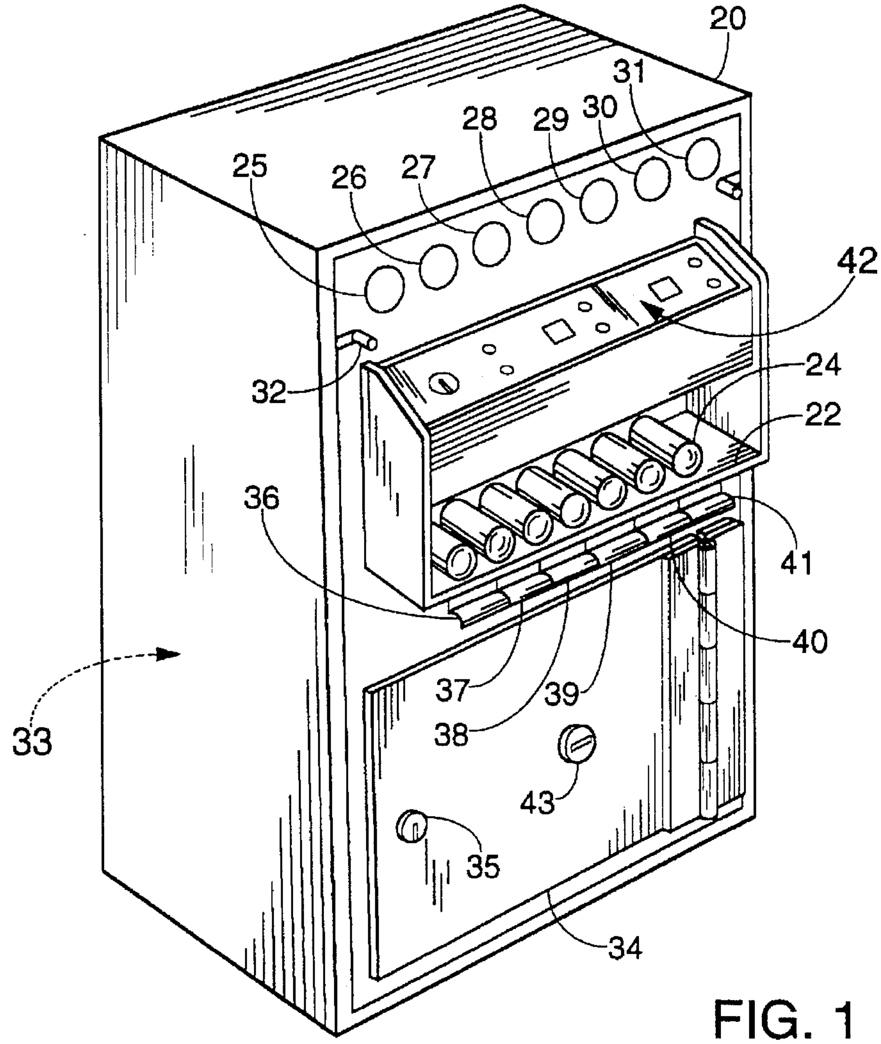
FIG. 1 shows a preferred embodiment of the present invention as it appears when closed.

In FIG. 1, outer case 20 of the present invention is shown to include storage shelf 22 with a supply of cylindrical currency containers 24, which are sized to receive either coins or rolled bills. In this embodiment, apertures 25–31, are provided to receive currency in containers 24. The containers 24 are inserted into the appropriate aperture 25–31 and are supported and aligned by an internal mechanism as is later described, until released by movement of release lever 32. The number of such apertures may vary with more or fewer being useful in specific applications. In this embodiment, aperture 25 communicates directly with primary chamber 33, situated in the lower portion of case 20. Access to primary chamber 33 is gained through door 34 by means of keyed lock 35 and manager key lock 43, so that two keys are required. The remaining apertures 26–31 are for securing and dispensing currency as needed for change or cash disbursements. In this preferred embodiment, aperture 26 may be designated to receive dimes, aperture 27 to receive quarters and apertures 28–31 to receive one, five, ten and twenty dollar bills respectively. As described below, drawers 36–41 provide access to this currency when the need arises.

Figure 1A:
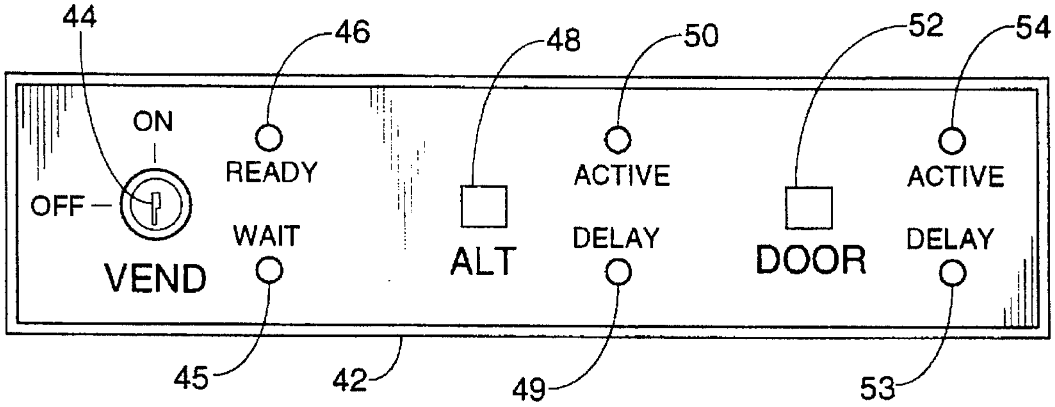
FIG. 1A shows the access control panel of the preferred embodiment of FIG. 1.

Access to primary chamber 33 or to any drawer dispensed currency is granted only after a programmed time delay period. Normally, a longer delay is imposed for opening door 34 as compared to that for operating a drawer 36–41 and only one such drawer can be operated per delay period. Access requests are entered and the current access status is indicated on control panel 42 as shown in FIG. 1A. There, key operated vend switch 44 is shown in the ON position, which initiates the drawer access time delay period. During this period, WAIT LED 45 flashes on and off. After an arbitrarily determined length of time, which may be two minutes, the delay ends, WAIT LED 45 goes off and READY LED 46 lights. At this point, any one of the drawers 36–41, may be opened and the container 24 inside removed. Opening this one drawer turns off READY LED 46 and causes the opening of any other drawer to be blocked. If vend switch 44 remains in the ON position, closing the drawer starts another cycle, with WAIT LED 45 flashing on and off.

An alternate, shortened time delay is available for drawer access by turning manager key lock 43 to the ON position and pressing ALT control button 48. DELAY LED 49 will light until an arbitrary delay period, such as ten minutes, has elapsed and then, ACTIVE LED 50 will turn on to indicate that access will be granted after a shortened delay period, such as thirty seconds. When manager key lock 43 is turned back to OFF, the delay period reverts to the longer time.

To open door 34, manager key lock 43 is turned to the ON position and DOOR control button 52 is pressed. DELAY LED 53 will light until an arbitrary delay period, such as ten minutes, has elapsed and then, ACTIVE LED 54 will turn on to indicate that access will be granted for a similar period. During this period, 12VDC solenoid 35S (see FIG. 5) releases keyed door lock 35 to be unlocked so that door 34 can be opened. As a convenience feature, the drawer access time delay can be shortened to a minimal period, such as one second, while door 34 is unlocked.

Figure 2:
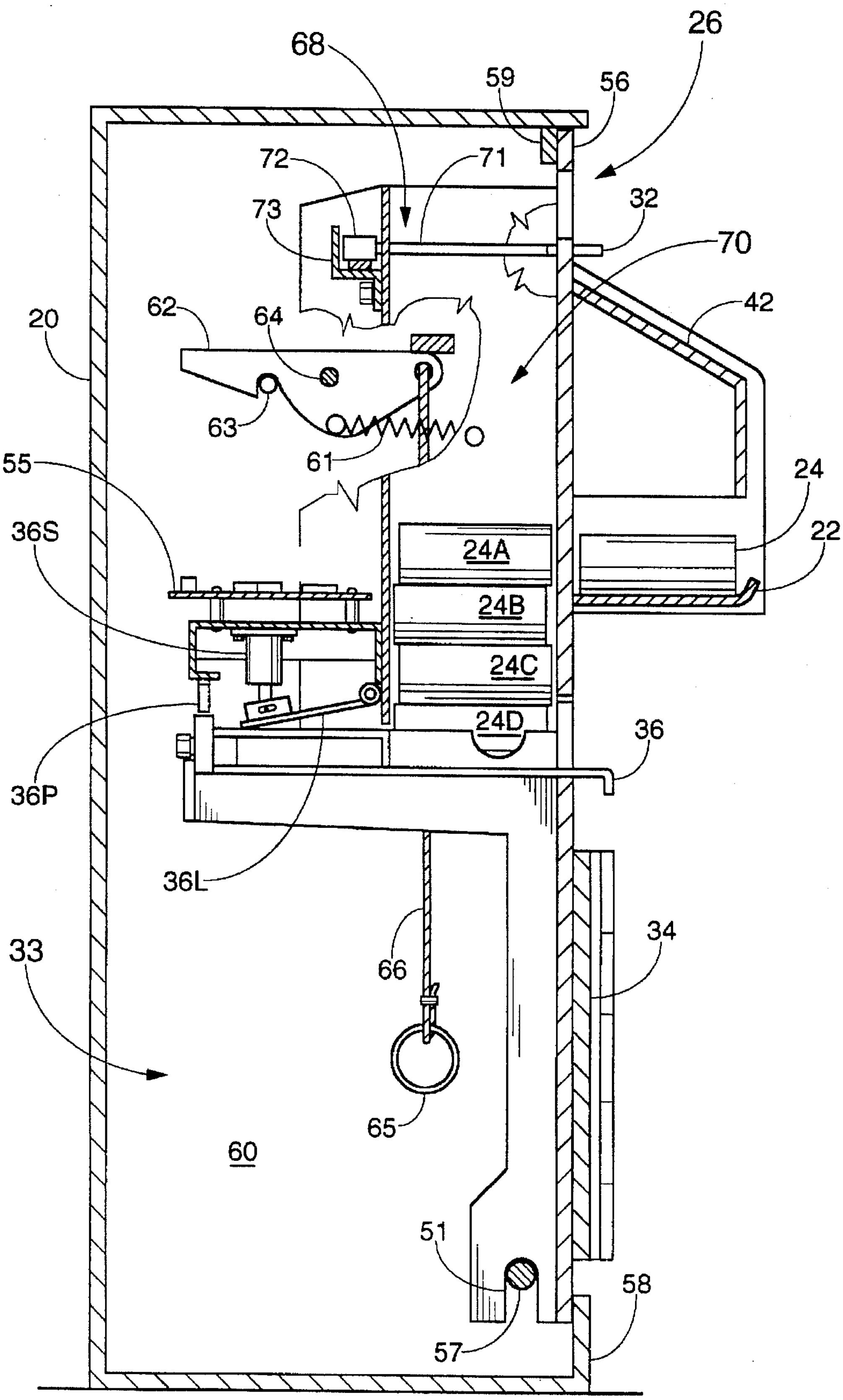
FIG. 2 shows a section view of the embodiment of FIG. 1.

FIG. 2 shows a cross-section view, taken along the vertical plane of aperture 26, of the preferred embodiment of the present invention discussed in FIG. 1. Open slot 51, fixed to front panel 56, is seen to be pivotally engaged with retaining bar 57, which is mounted across the sides 60 of outer case 20. Front panel 56 closes securely against case bottom front bar 58 and top front bar 59 and is held in place by the engagement of spring loaded latch member 62 with catch 63. Latch member 62 is urged into the holding position by spring 61 and can be moved to pivot about mounting pin 64 to a releasing position by pulling on ring 65 and cable 66.

Container release lever 32 is seen to extend through front panel 56 as part of container alignment and release mechanism 68 and each aperture, such as aperture 26, is located to feed containers 24 into a separate chute 70. Chute 70 is sized so that cylindrical containers 24A–D stack in a single vertical row. Alignment and release mechanism 68 comprises a horizontal support bar 71 for each chute, located so that it must be moved to allow a container 24 to drop into chute 70. Support bars 71 are mounted on shift bar 72 so that they, and shift lever 32, are commonly parallel and slideably retained for lateral movement by angle assembly 73. Lowermost container 24D is seen to reside in drawer 36, with that drawer being retained in position by drawer latch 36L where its closed position is sensed by proximity switch 36P. Latch 36L is released by energizing 12VDC solenoid 36S long enough to allow drawer 36 to be opened.

Circuit board 55 controls all time delays and operating sequences using circuits and components well known to the control circuit arts, including summing logic to allow the release of only one drawer latch after any given time delay period. Manual selection and operation of drawers 36–41, as compared to a powered currency dispensing system, reduces the machine's power requirement so that a light duty 12VDC supply is sufficient. This 12VDC supply is readily provided by a small transformer/rectifier plugged into a 120 VAC outlet. Operating on 12VDC allows a battery back-up to be provided so that access cannot be denied by power service failures.

Figure 3:
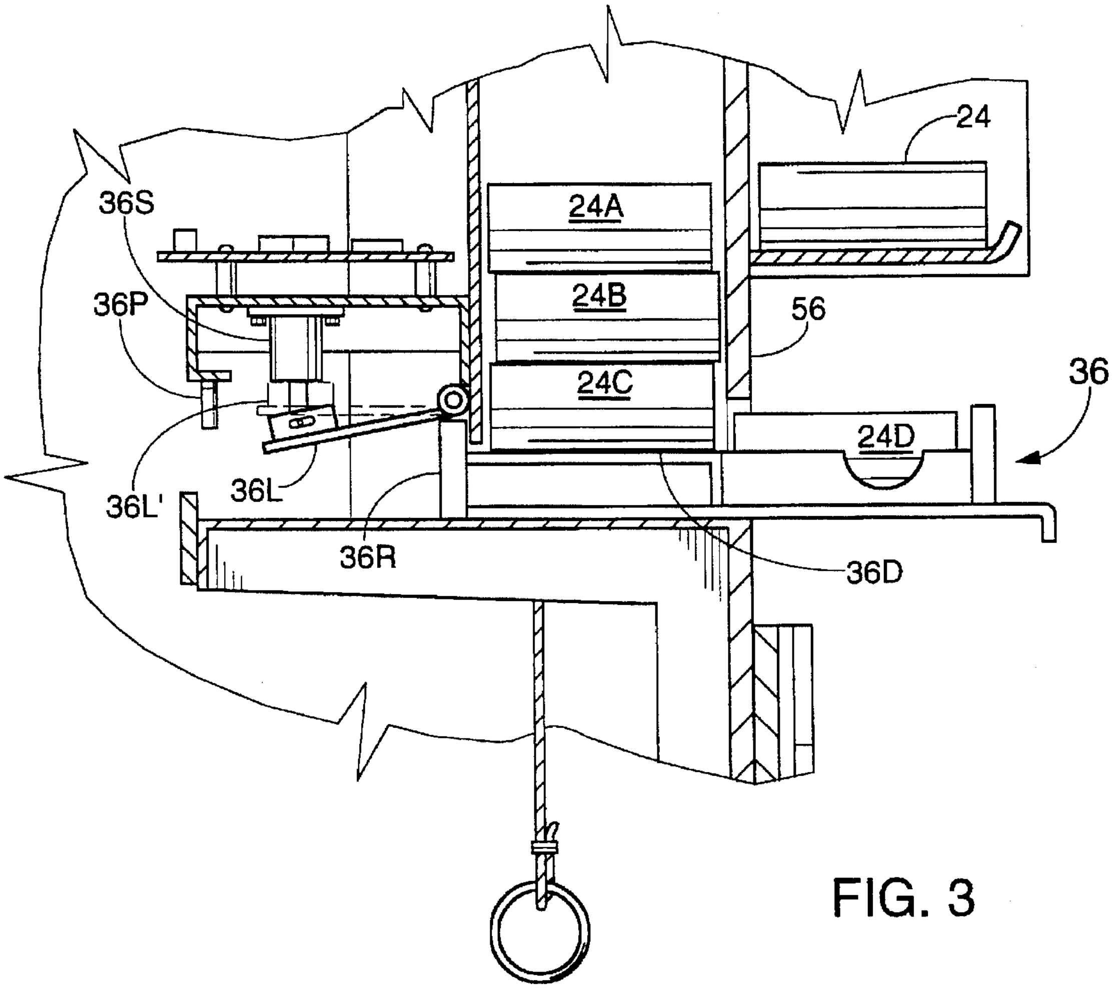
FIG. 3 is a partial cross-section view showing the embodiment of FIG. 1 as it appears when a change dispensing slide is pulled out.

FIG. 3 shows drawer 36, now displaced to the open position where container 24D can be removed from the stack of containers 24A–D. When drawer 36 was selected for opening, and moved out of the range of proximity switch 36P, 12VDC solenoid 36S was briefly energized to raise latch 36L to position 36L' so as to allow full withdrawal. As container 24D was displaced out from below container 24C, the stack dropped down to rest on deck 36D of drawer 36, making it necessary to remove container 24D before re-closing drawer 36. As drawer 36 moves back into the closed position, rear plate 36R pushes latch 36L up, until it drops back into the latching position as shown in FIG. 2. Container 24C is not fully cleared to drop into place in drawer 36 until after rear plate 36R is well past latch 36L, so as to assure positive engagement thereof.

Figure 4:
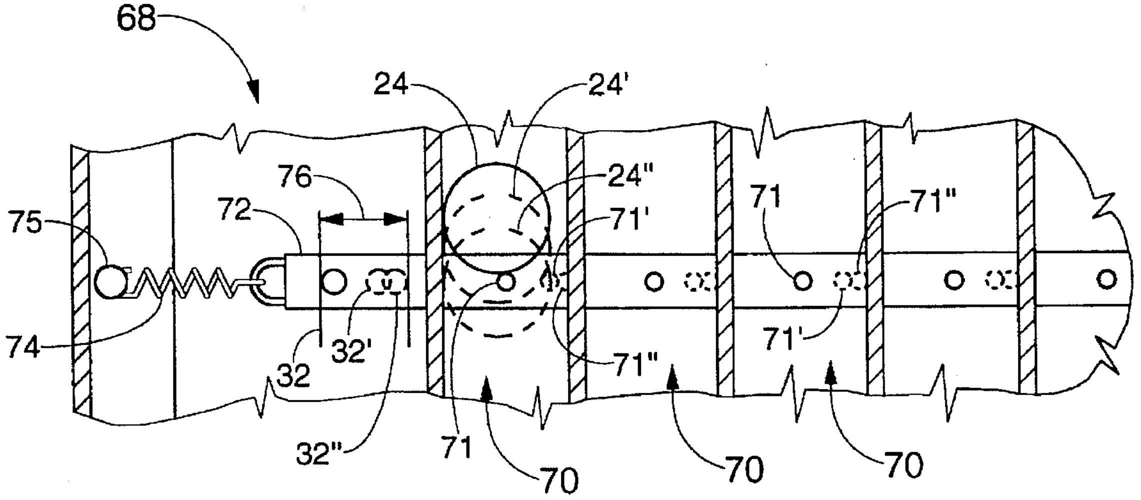
FIG. 4 shows the operation of the container alignment and release mechanism of the embodiment of FIG. 1.

FIG. 4 shows the operation of container alignment and release mechanism 68 wherein release lever 32 is constrained to move within a dimensional limit 76. Movement of release lever 32 and the resultant repositioning of support bars 71 and container 24 is indicated by corresponding prime (32', 71' & 24') and double prime (32", 71" & 24") notations. Shift bar 72 is urged toward spring attachment lug 75 by return spring 74 to release lever 32 position and, at this point, container support bars 71 are uniformly located at the approximate center of the width of chutes 70. With support bars 71 so located, container 24 will be stopped as shown in any chute 70. The first shown movement to release lever position 32' results in the corresponding support bars position 71' and repositioning of container 24'. Inasmuch as support bars 71' are horizontal and contact the surface of cylindrical container 24' along a straight line, its longitudinal axis must also be horizontal. The horizontal attitude is maintained as release lever 32 is moved to position 32", at which point container 24" is no longer restrained by support bar 71" and drops into chute 70.

Figure 5:
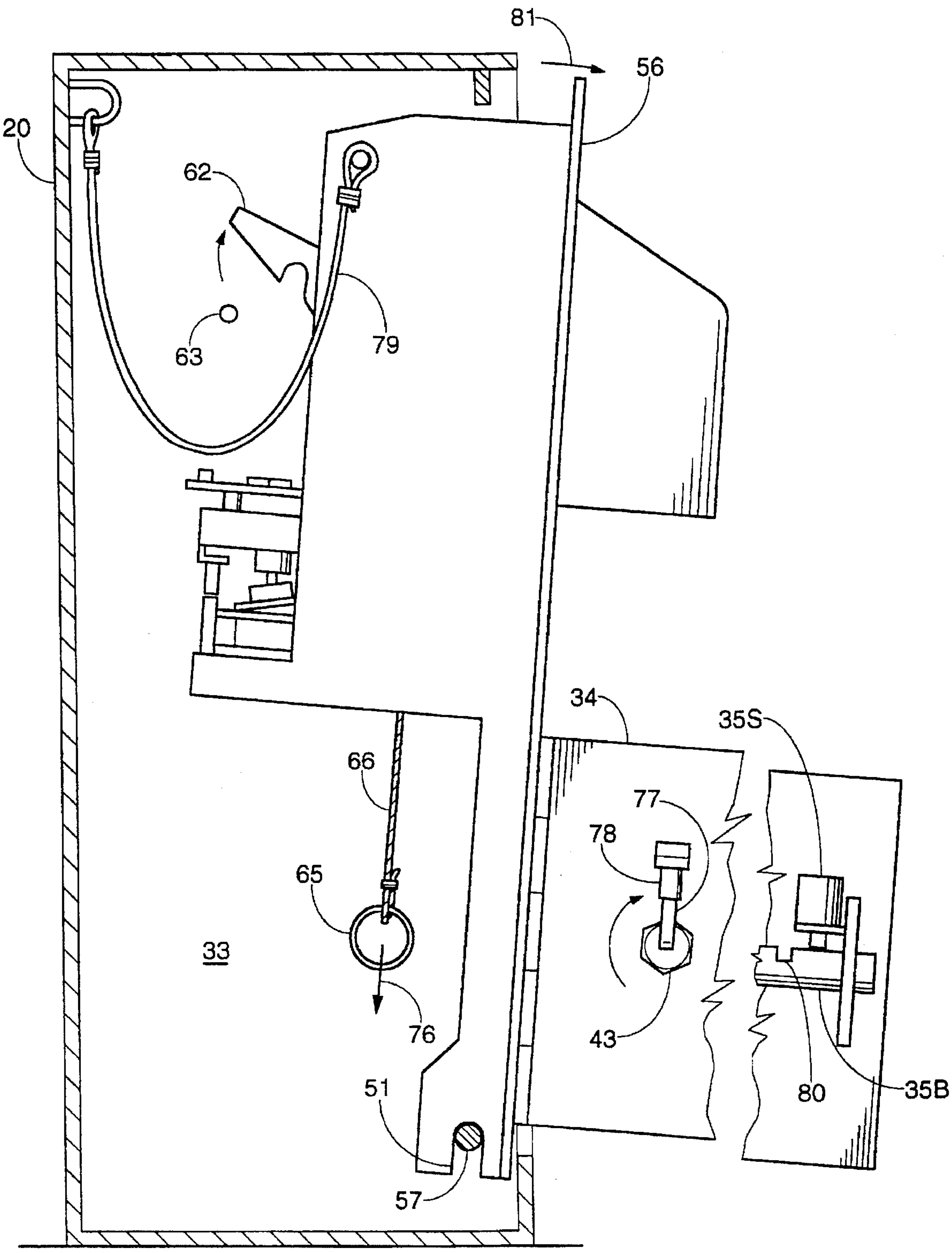
FIG. 5 is a cross-section of the embodiment of FIG. 1 showing the release and opening of the front panel as for servicing.

FIG. 5 shows how tang 77 of manager key lock 43 engages proximity switch 78 to actuate solenoid 35S and pull it out of engagement with locking notch 80 of bolt 35B. This permits keyed door lock 35 to withdraw bolt 35B and allow door 34 to be opened for access to primary chamber 33. With door 34 open, ring 65 and cable 66 may be pulled down, as indicated by arrow 76, to rotate and release latch 62 from engagement with catch 63. Thus unlatched, front panel 56 is free to swing forward as indicated by arrow 81. Closing door 34 then will permit front panel 56 to swing out to the length limit of cable 79 for access.

It is to be understood that the present invention is not limited to the embodiments disclosed but may also be expressed in other embodiments within the spirit of the invention, through rearrangement, modification or substitution of parts.

I claim:

1. Limited access currency securing and dispensing apparatus comprising:

a safe box including a front panel and a primary chamber;

a plurality of cylindrical currency containers, each of like dimensions and having a longitudinal axis;

a plurality of container receiving chutes sized to hold said containers, with said axis horizontal, in a single stacked row;

at least two apertures in said front panel, each said aperture being aligned with one said container receiving chute and sized to allow only axial insertion of one said container therethrough at a time;

at least one container support bar located to support said one container, as inserted through one said aperture, on at least two points along a line parallel to the longitudinal axis of said one container so as to align said one container with said one container receiving chute; and means for lateral movement of said support bar so as to drop said supported and aligned one container into said one container receiving chute.

2. Limited access currency securing and dispensing apparatus according to claim 1 and further comprising means for displacing said containers from said single stacked rows to permit withdrawal thereof.

3. Limited access currency securing and dispensing apparatus according to claim 2 wherein said means for displacing comprises:

a plurality of drawers, each vertically aligned with one said container receiving chute so as to hold the lowermost said container of said single stacked row received therein, said drawers being manually movable from a container receiving position to a container withdrawal position; and interlocking means for allowing only one said drawer to be moved from the container receiving position at any time.

4. Limited access currency securing and dispensing apparatus according to claim 1 and further comprising:

an aperture in said front panel leading to said primary chamber, said aperture being sized to allow only axial insertion of one said container therethrough; and means for access to said primary chamber, said access means including a requisite first delay period before allowing access.

5. Limited access currency securing and dispensing apparatus according to claim 1 and further comprising a lockable door in said front panel.

6. Limited access currency securing and dispensing apparatus according to claim 5 and further comprising:

a latch located inside of said safe box and holding said front panel in place; and means for releasing said latch so that said front panel can be moved to an open position, said releasing means being operable only through said lockable door.

7. Limited access currency securing and dispensing apparatus according to claim 1 and further comprising:

a latch located inside of said safe box and holding said front panel in place; and means for releasing said latch so that said front panel can moved to an open position, said releasing means being operable only from inside said primary chamber.

8. Limited access currency securing and dispensing apparatus according to claim 1 and further comprising:

a common member interconnecting a plurality of said container support bars so that said means for lateral movement thereof is effected by movement of said common member.

* * * * *